United States Patent [19]
Muscatell

[11] Patent Number: 5,465,817
[45] Date of Patent: Nov. 14, 1995

[54] HYDRAULIC BRAKE PUMP WITH ECCENTRIC CAM AND RECIPROCATING PISTON

[76] Inventor: Ralph P. Muscatell, 2007 NE. 20th Ave., Ft. Lauderdale, Fla. 33305

[21] Appl. No.: 349,547

[22] Filed: Dec. 5, 1994

Related U.S. Application Data

[63] Continuation-in-part of Ser. No. 149,564, Nov. 9, 1993, Pat. No. 5,373,921, which is a continuation of Ser. No. 982,617, Nov. 27, 1992, abandoned.

[51] Int. Cl.⁶ .................................................. F16D 57/06
[52] U.S. Cl. ......................... 188/295; 188/294; 188/290; 303/10
[58] Field of Search ................................. 188/290, 291, 188/292, 293, 294, 295, 297, 299, 302–310, 264 P, 264 E; 303/10–12, 61, 116.4, 116.3

[56] References Cited

U.S. PATENT DOCUMENTS

| | | | |
|---|---|---|---|
| 1,658,960 | 2/1928 | Adams | 188/295 |
| 2,845,149 | 7/1958 | Stern et al. | |
| 5,373,921 | 12/1994 | Muscatell | 188/292 |

Primary Examiner—Douglas C. Butler
Attorney, Agent, or Firm—Oltman and Flynn

[57] ABSTRACT

A hydraulic brake coupled to a rotary shaft including a hydraulic pump connected to the shaft, the pump having a pump inlet, and a pump outlet, a hydraulic loop having an inlet part connected to the pump outlet and an outlet part connected to the pump inlet, a flow control device positioned in the hydraulic loop between the inlet outlet parts for controlling flow of hydraulic fluid in the hydraulic loop, and a brake actuator connected to the flow control device for reducing the flow of hydraulic fluid in response to operation of the brake actuator. There is provided a hydraulic brake wherein the hydraulic pump includes a pump cylinder with a pump piston in the pump cylinder, a one way inlet valve in the pump cylinder fluidly communicating with the hydraulic loop outlet part, a one way outlet valve in the pump cylinder fluidly communicating with the hydraulic inlet part, reciprocating device in operative engagement with the pump piston for reciprocatingly moving the pump piston in the pump cylinder, the reciprocating device coupled to the rotary shaft. The hydraulic brake includes a camshaft, at least one cam on the cam shaft in operative engagement with the pump piston for driving the pump piston into the pump cylinder with each revolution of the camshaft, and hydraulic fluid bias pressure supply device for applying fluid bias pressure to the hydraulic fluid in fluid communication with the hydraulic loop outlet part.

18 Claims, 6 Drawing Sheets

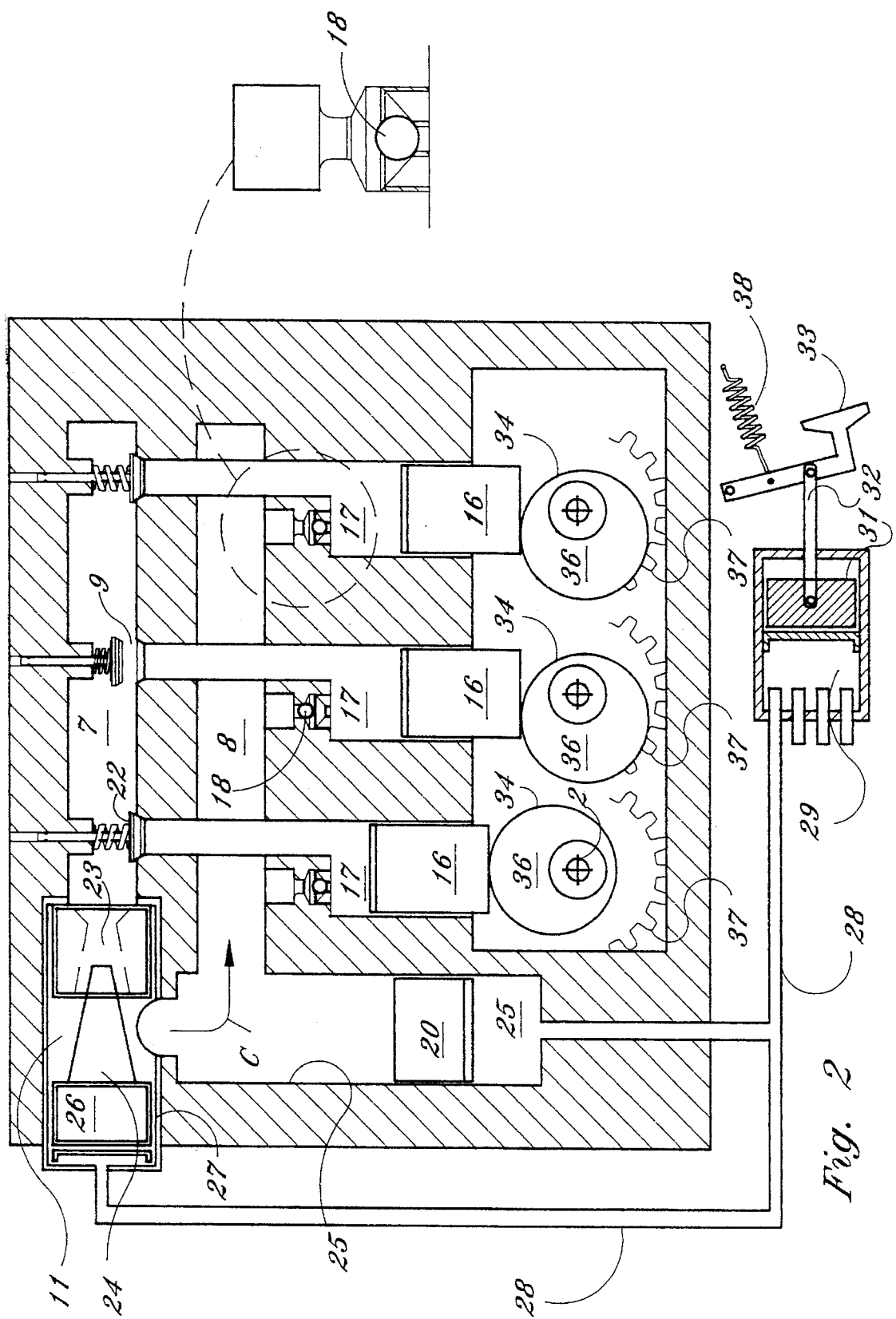

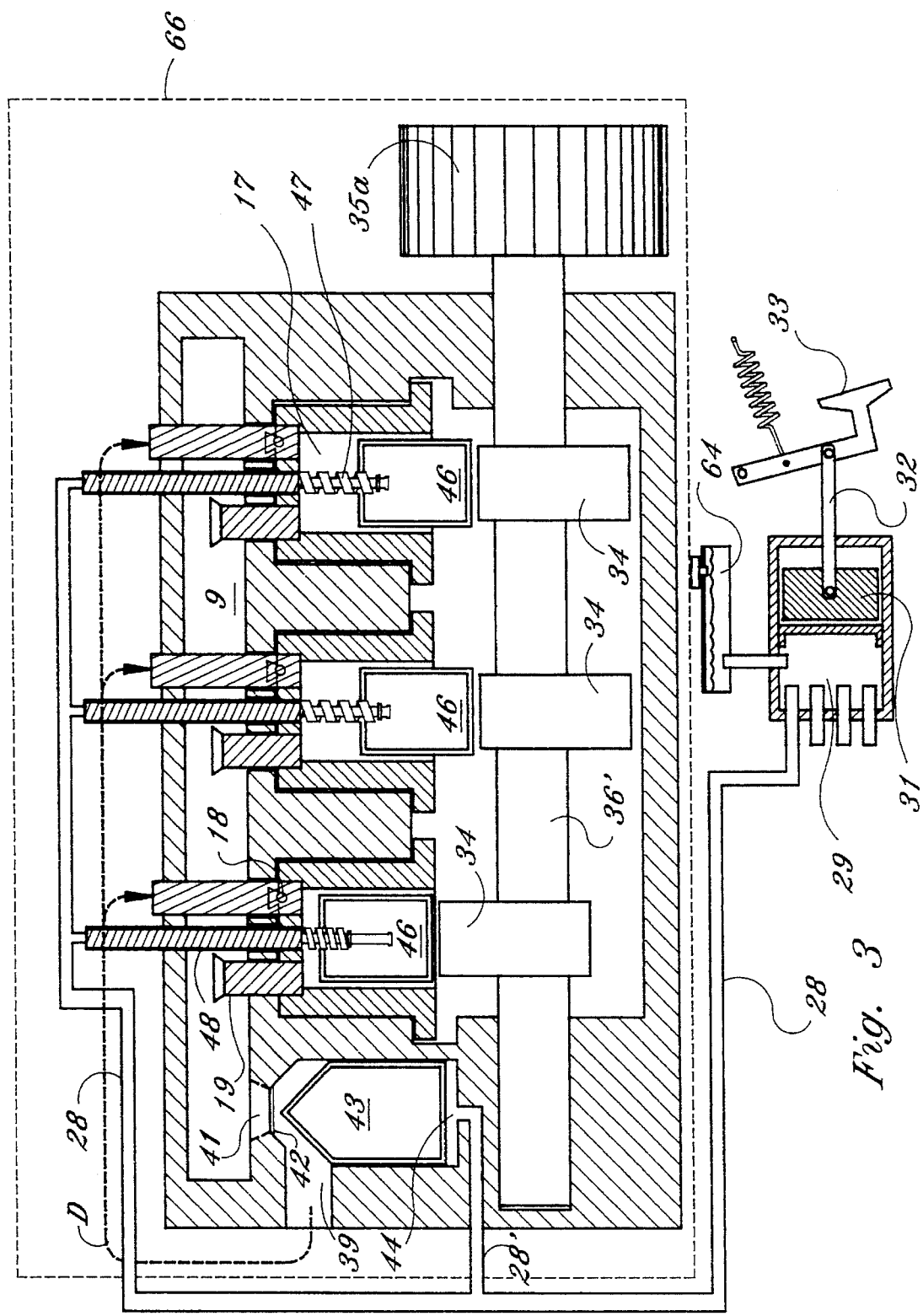

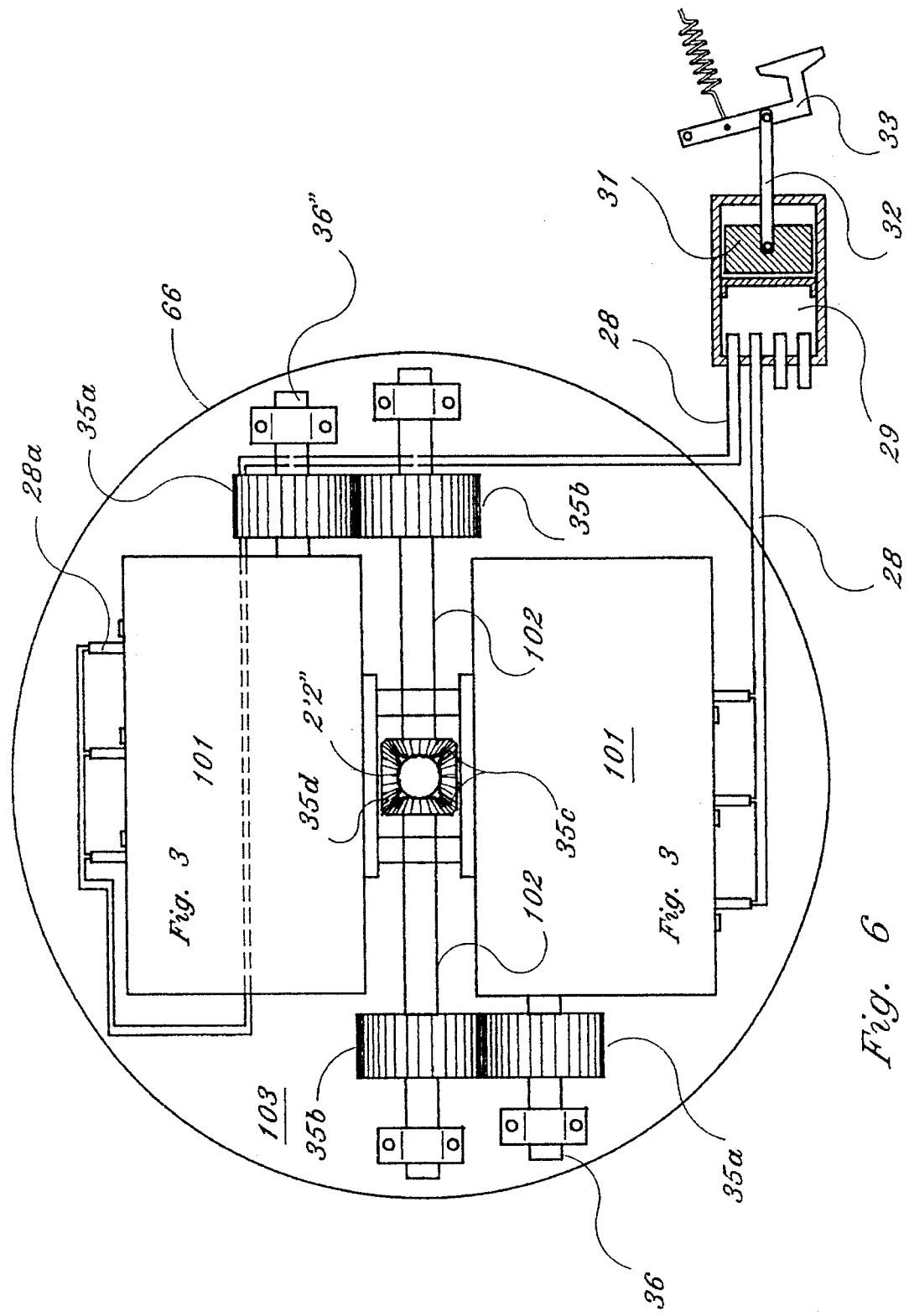

5,465,817

HYDRAULIC BRAKE PUMP WITH ECCENTRIC CAM AND RECIPROCATING PISTON

This application is a continuation-in-part of application Ser. No. 08/149,564 filed Nov. 9, 1993, now U.S. Pat. No. 5,373,921, which was a continuation of Ser. No. 07/982,617 filed Nov. 27, 1992, now abandoned.

The invention relates to an automotive braking system for braking rotating wheels of an automobile, and more particularly to a braking system using a hydraulic fluid as the braking medium, wherein the rotating wheel is connected to a hydraulic pump that circulates the fluid through a proportional control valve linked to a brake lever. It is to be understood that air is considered to be an equivalent to hydraulic fluid.

BACKGROUND AND PRIOR ART

The braking systems of the known art are composed of brake shoes with a brake lining of compressed asbestos in a matrix of binding material that operate on a brake drum or brake disc. The conventional brakes are subject to wear, and the wear products introduce hazardous materials into the environment. The brake drum or disc is also subject to wear, and requires periodic machining or replacement in order to restore braking. The conventional brakes also suffer from the drawback that they lose braking effect if they get wet, and they get very hot after prolonged hard braking. Conventional brakes also tend to "fade" after prolonged hard braking.

It is accordingly an object of the present invention to provide a braking system that does not have the drawbacks of the existing braking systems, such as wear, susceptibility to overheating and fading after long braking, and loss of friction when exposed to wetness.

Applicant is unaware of any pertinent prior art relating to the invention.

SUMMARY OF THE INVENTION

According to the invention there is provided a hydraulic brake coupled to a rotary shaft. It includes a hydraulic pump connected to the shaft, the pump having a pump inlet, and a pump outlet, a hydraulic loop having an inlet part connected to the pump outlet and an outlet part connected to the pump inlet, flow control means disposed in the hydraulic loop between the inlet part and the outlet part for controlling flow of hydraulic fluid in the hydraulic loop, and a brake actuator connected to the flow control means for reducing the flow of hydraulic fluid in response to operation of the brake actuator.

According to a further feature, there is provided a hydraulic brake wherein the hydraulic pump includes at least one pump cylinder, a pump piston in the pump cylinder, a one way inlet valve in the pump cylinder fluidly communicating with the hydraulic loop outlet part, a one way outlet valve in the pump cylinder fluidly communicating with the hydraulic inlet part, reciprocating means in operative engagement with the pump piston for reciprocatingly moving the pump piston in the pump cylinder, and wherein the reciprocating means are coupled to the rotary shaft.

According to still another feature, the hydraulic brake includes in the reciprocating means a camshaft, at least one eccentric cam on the cam shaft in operative engagement with the pump piston for driving the pump piston into the pump cylinder with each revolution of the camshaft.

According to a further feature, the flow control means include a fluid flow control valve having a flow control cylinder, a flow control piston slidably disposed in the flow control cylinder, brake linkage means for linking the brake actuator with the flow control piston, and wherein the flow control valve includes a flow control aperture, and a conical projection aligned with the flow control aperture, the conical projection extending from the flow control piston toward the flow control aperture. Another feature associated with the flow control means includes upstream of the flow control aperture a pressure chamber into which hydraulic fluid is pumped from respective cylinders, and downstream of the flow control aperture a displacement control chamber/supply loop.

According to an additional feature, the hydraulic pump includes a plurality of hydraulic cylinders, an equal plurality of camshafts, each camshaft having a respective cam, wherein the cams are angularly off-set from each other by equal angles, and gearwheel means for mutually locking the camshafts into equal angle positions.

According to still another feature, the brake linkage means include a hydraulic brake master cylinder, a brake master piston slidably disposed in the brake master cylinder, and multiple hydraulic brake lines fluidly connecting the brake master cylinder with multiple hydraulic lock units for actuating the fluid flow control pistons in a plurality of hydraulic brakes in response to operation of the brake actuator. This feature causes equalization of the fluid pressure in all commonly connected flow control pistons of the brake pumps.

The hydraulic brake according to the invention may include a hydraulic fluid tank fluidly communicating with the brake master cylinder, for supplying hydraulic fluid to the brake master cylinder, and the hydraulic pump may include a plurality of hydraulic cylinders, an equal plurality of eccentric cams, wherein the eccentric cams are disposed on a common camshaft, and wherein the eccentric cams are angularly off-set from each other by equal angles.

Further objects and advantages of this invention will be apparent from the following detailed description of a presently preferred embodiment which is illustrated schematically in the accompanying drawings.

BRIEF DESCRIPTION OF THE FIGURES

FIG. 2 is a cross-sectional elevational view of the invention in the form of a hydraulic pump having reciprocating pistons having a fluid displacement cylinder for piston control.

FIG. 3 is a cross-sectional elevational view of the invention in the form of a hydraulic pump having spring-biased hydraulic pistons;

FIG. 6 is a diagrammatic elevational view of two brake pumps in a common fluid-filled enclosure, commonly connected to a wheel shaft.

DESCRIPTION OF THE PREFERRED EMBODIMENTS

Figure 1:
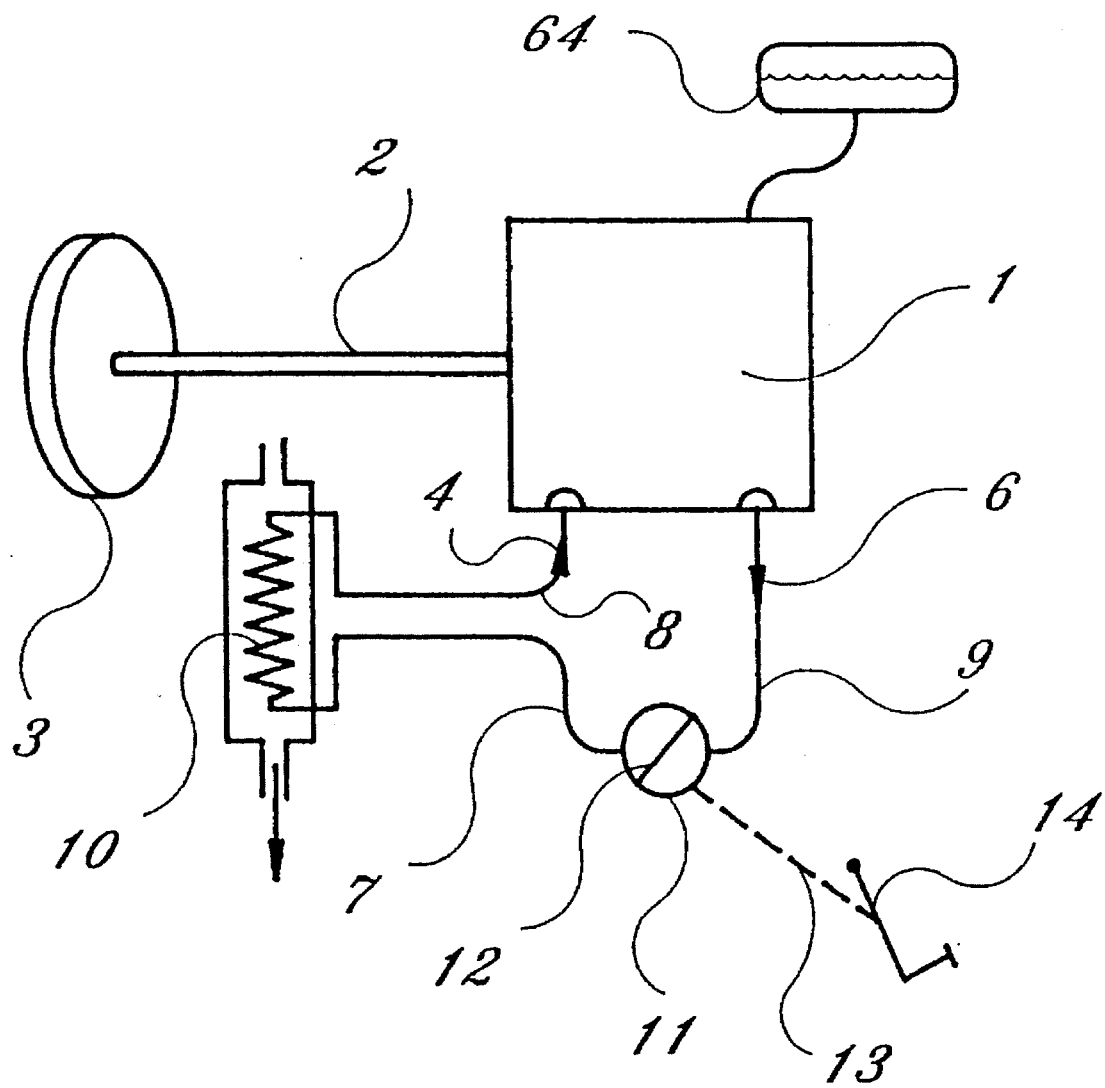
FIG. 1 is a diagrammatic view of the invention in its most basic form.

In FIG. 1 a brake system according to the invention is composed of a hydraulic brake pump 1 connected to a rotary shaft 2, which supports a wheel 3 of, for example, an automobile which needs to be connected with a braking device. The hydraulic pump 1 has a pump inlet 4 and a pump outlet 6 connecting the pump 1 with a hydraulic loop 7, having a loop outlet part 8 connected with the pump inlet 4 and a loop inlet part 9 connected with the pump outlet 6. A hydraulic flow control device 11 inserted in the hydraulic loop 7 has a flow control element 12 coupled via suitable brake linkage 13 to a brake actuator 14.

The brake actuator 14 is typically a brake pedal of an automobile.

The hydraulic brake pump 1 may be of a construction known, for example, as a piston pump, which can have any number of pistons, or a rotary hydraulic pump, known, for example, as a gearwheel pump or a vane pump.

The brake system according to FIG. 1 may advantageously include a hydraulic fluid cooler 10 connected to the hydraulic loop 7, wherein the hydraulic fluid can be cooled in case prolonged heavy braking is required. In such cases the hydraulic fluid can become overheated and external cooling may be required.

A hydraulic fluid tank 64 supplies hydraulic fluid to the braking system to replace fluid loss through evaporation and leakage.

FIG. 2 shows the pump 1 in the form of a piston pump having, for example, three pump pistons 16 each reciprocatingly contained in a respective pump cylinder 17. Each cylinder 17 is connected via a one-way intake valve 18 with the outlet part 8 of the hydraulic loop 7, and via a one-way outlet valve 22 with the inlet part 9 of the hydraulic loop 7. The respective hydraulic loop inlet and outlet part 9, 8 are connected via the flow control device 11, which is illustrated as a modified needle valve.

It follows that the flow control device may be realized as any of a number of conventional fluid control valves.

The flow control valve 11 has a flow control aperture 23 aligned with a circular conical projection 24 mounted on a flow control piston 26, slidably contained in a flow control cylinder 27. The flow control cylinder 27 is connected via a displacement control cylinder 25 and a displacement control piston 20 slidably disposed in the displacement control cylinder 25, and a hydraulic brake line 28 with d brake master cylinder 29, containing a brake master piston 31, which is in turn connected via brake connecting rod 32 with a brake actuator 33, e.g. in the form of an automotive brake pedal 33.

Each pump piston 16 is in contact with a respective circular eccentric cam 34. The eccentric cams 34 are mutually off-set by equal angles, i.e. in this example by 120 degrees angle. Each cam 34 is mounted on respective shaft sections 36, at least one of which is connected with the rotary shaft 2 (FIG. 1), and are mutually locked by means of respective meshing gear wheels 37 shown only partially for the sake of clarity. In their extended operative positions, the pump pistons 16 are driven in reciprocating motion by cams 34 in their respective cylinders 17, causing hydraulic fluid to be pumped in circulating flow direction, indicated by arrow C through the flow control device 11. As a result of operating the brake actuator 33 fluid pressure acts on the flow control piston 26. This causes the conical projection 24 to be driven against the flow direction of fluid being pumped through the aperture 23, thereby throttling down the flow of fluid through the hydraulic loop 7, and causing the pump to exert a braking action on the shaft 2. The circulating fluid applies back pressure on the flow control piston 26, which is transmitted back to the master piston as a reactive force that is sensed by the person operating the brake actuator 33.

The fluid transmitted during braking from the master cylinder, forcing displacement control piston 20 upward, causes the volume of fluid contained in the hydralic loop 7 and in the pump cylinders 17 to be displaced with the result that the pump pistons 16 are driven downward into engagement with the eccentric cams 34. Therefore the pump pistons 16 are only in engagement with the eccentric cams 34 during braking, while during non-braking conditions the pump pistons are retracted into the pump cylinders 17 without causing drag on the shaft 2.

Figure 7:
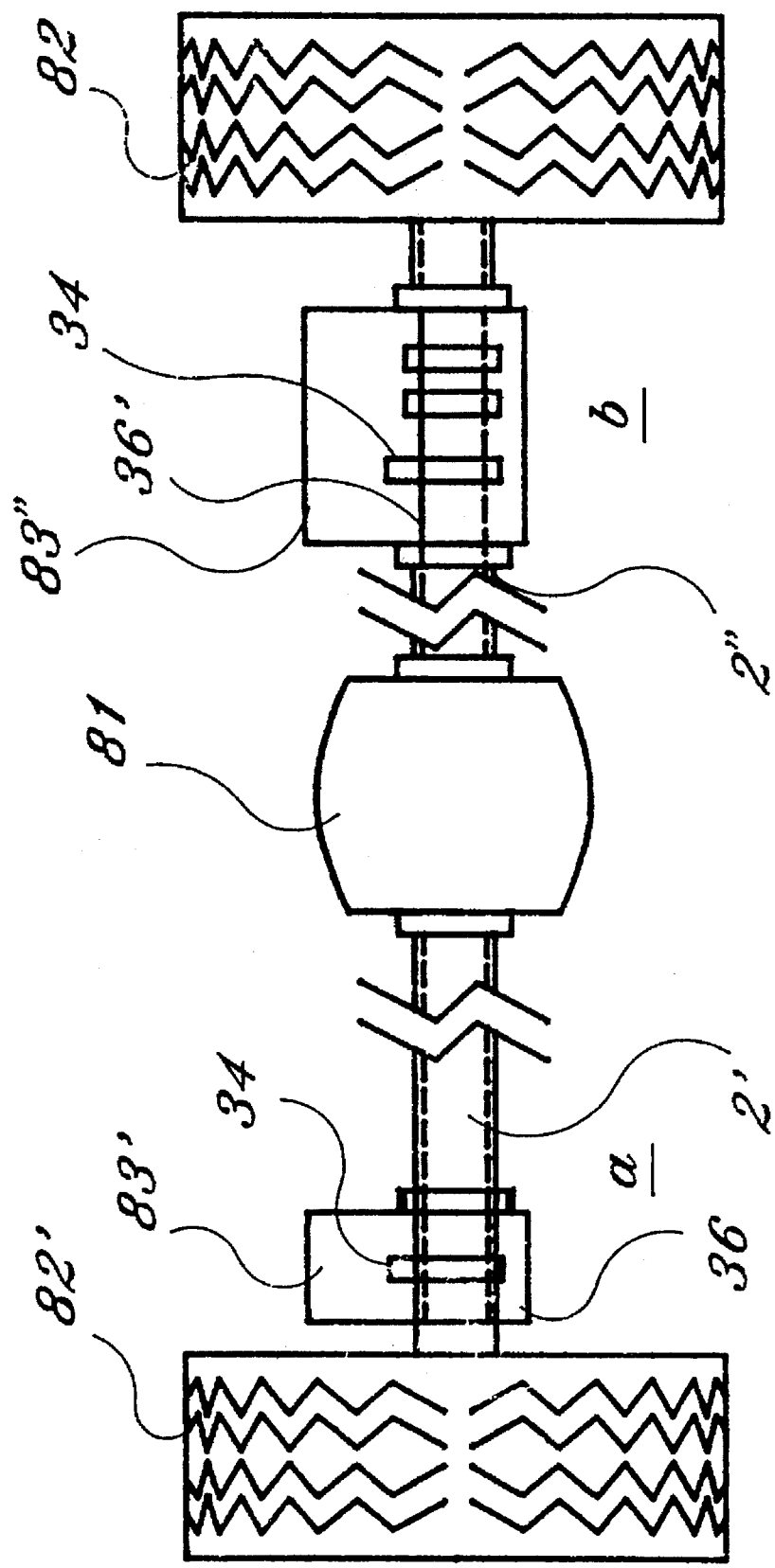
FIG. 7 is a diagrammatic elevational view of a vehicular drive axle, showing a differential and two hydraulic brake pumps.

FIG. 6 shows two piston pumps, e.g. of the type shown in FIG. 2 or 3, disposed at the end of a motor vehicle axle 2',2". As is typical in the present art, the vehicle axle shaft is seen at 2', 2" (FIG. 7). A 90 degree coupling is made by 45 degree bevel gears 35c, 35d. These gears are mounted in a support framework which is affixed to a back plate 103 of the pumps. By means of the respective shafts 102 and coupling gears 35a, 35b the driven gear 35a of the hydraulic lock mechanism(s) is (are) engaged with the vehicle wheel axle 2',2". As the wheel axle 2',2" turns, so turns the hydraulic lock mechanism(s). As the free turning of the hydraulic pumps are restricted in rotation or stopped so also is the vehicle axle, and the wheels are slowed or stopped.

The entire pump arrangement is advantageously constructed as a single fluid filled enclosure or housing that also forms the inlet and outlet portions of the circulating loop, as seen in FIG. 3 and FIG. 6.

Referring to FIG. 3, the pump 1 is coupled to the vehicle axle by the driven gear 35a. The driven gear 35a drives the pump shaft 36' which supports full circle eccentric cams 34. In a no-braking condition the eccentrics 34 push pump pistons 46 to the top of cylinders 17 where they come to rest. The eccentrics 34, shaft 36, driven and coupling gears 35a then rotate 'free wheeling' with the vehicle in motion. As the pump pistons 46 are not caused to reciprocate in the freewheeling state, minimum operational drag on shaft 36' results.

When braking effect is desired, the hydraulic brake system is actuated. A conventional master cylinder 29 and foot pedal 33 transmits fluid pressure via hydraulic pipes 28 simultaneously to the piston control springs 47 (FIG. 4) and to flow control valve 39 (FIG. 3). With increasing pressure the piston control springs 47 are pressed against main pump pistons 46 forcing them to follow the eccentrics 34 and cycle up and down. With increasing pressures from the brake actuator 33, the piston control springs 47 will cause the pistons 46 to follow the eccentrics 34.

As the main pump pistons 46 cycle up and down they alternately draw in and expel hydraulic fluid via inlet valve 18 and outlet valves 19. Ball and seat valves are used for the inlet and flapper valves for the outlets (FIG. 3). The valves insure that fluid flows from the outside, symbolically indicated by dashed line D (FIG. 3) which is space defined by the dash-dot line 66, into the cylinder 17 on the downstroke of the main piston 46 via the inlet valve 18 and thence on the upstroke out the outlet valve 19 and into the pressure chamber 9. The three eccentrics 34 are angularly spaced at 120 degrees and therefore at least one piston is always on the upstroke.

Simultaneously the brake system is, via the foot pedal, causing the flow control valve 39 to close. The flow control valve 39 controls the exit of the hydraulic fluid from the pump pressure chamber. As the fluid flow is so restricted, the pump pistons on the upstroke are impeded; a braking effect results. When the control valve is closed completely the hydraulic fluid cannot circulate out of the pressure chamber, thus the pistons are stopped causing hydraulic lock, and the vehicle wheels stop turning.

The control valve 39 is comprised of a plunger 43 and seat 41 of aperture 42 so arranged that the plunger 43 must move directly into and against the fluid outflow. Thus pressures from the master cylinder system acting back on the foot pedal must overcome outflow pressures. These pressures are generated by the inertial energy of the motion of the vehicle. The brake system must meet—i.e. balance—and exceed these generated pressures resulting from vehicle motion. Thus the mechanism is pressure reactive. The amount of braking is proportional to the amount of pressure the operator applies to the brake pedal. This is one object of the invention.

FIG. 2 shows an alternate version of FIG. 3. It offers more direct and simpler gear coupling to the vehicle axle. It also offers a simpler means of controlling the main pump pistons, since the hydraulic fluid is contained within the pump.

Most of the same parts as are presented in FIG. 3 are incorporated in FIG. 2. Pump pistons, cylinders, eccentrics, pressure chamber and remotely operated control valve are retained. A hydraulic actuator/piston control spring is not used in FIG. 2, but a displacement control piston 20 and a displacement control cylinder 25 are added.

The eccentrics are three in number and each mounted on a respective gear driven shaft. The shafts are emplaced parallel on a horizontal line and aligned with a front to rear axis. The gears linking each of these shafts are on the rear side as seen in partial phantom lines.

FIG. 3 shows an embodiment wherein the eccentric cams 34 are mounted on a common shaft 36'. Each pump cylinder 17 has a one-way inlet valve 18 and a one-way outlet valve 19 as in FIG. 2. The inlet valves 18 are commonly connected to the outlet part of the hydraulic loop, indicated in FIG. 3 only by the dashed line arrow D, which is connected with the inlet part 9 of the hydraulic fluid loop. The entire pump is advantageously enclosed in a fluid-filled fluid enclosure 66 (FIG. 6), also indicated by dash-dot line 66 in FIG. 3. The fluid enclosure 66 provides cooling for the circulating fluid. The fluid flows through the flow control valve 39, which is composed of a the valve seat 41 with the flow control aperture 42, and a flow control piston 43 slidably contained in a flow control cylinder 44, connected with the brake line 28 via a brake line branch 28'. Each pump cylinder 17 contains a reciprocating pump piston 46, that is different from the pump piston 16 in FIG. 2 in that it includes the piston control spring 47, seen in more detail in FIGS. 4 and 5.

Figure 4:
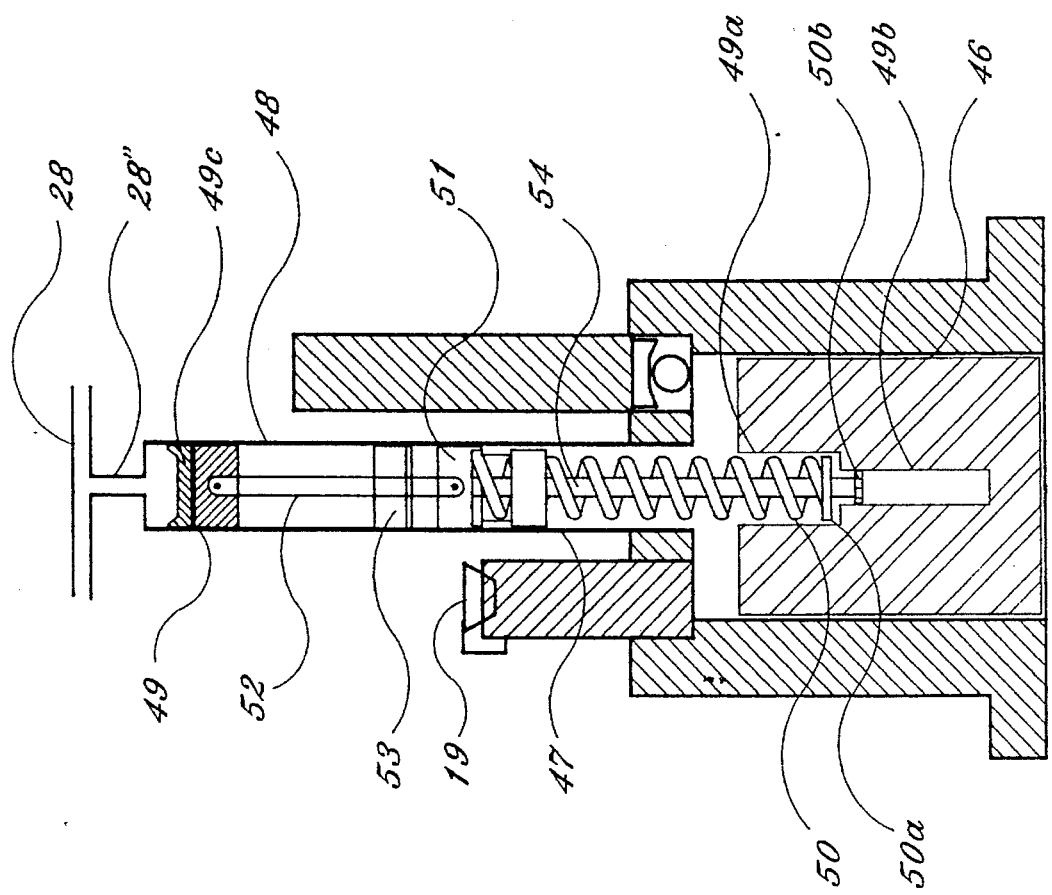
FIG. 4 is a fragmentary elevational detail view of a single pump cylinder and a spring biased pump piston of FIG. 3.

FIG. 4 shows the control spring 47 formed as a helical compression spring having a lower end 50 (FIG. 4) seated in a spring recess 49a in the upper end of the piston 46. The control spring 47 is enclosed in a spring housing 48, which also contains a spring retaining slide piston 49 slidably disposed in spring housing 48 sealed by a piston seal 49c, and connected via piston rod 52 with a brake control piston 51. A sealed cover plate 53 has a central hole for admitting the piston rod 52. A spring rod 54 is threaded through the piston control spring 47 and through an end plate 50a, with a center hole for admitting the spring rod 54. The spring rod 54 is terminated in an end stop 50b that retains the end plate 50. The end plate 50a maintains the control spring 47 in a tensioned state. The upper end of the spring housing 48 is connected to a branch 28" of the brake line 28 connected to the brake master cylinder 29.

In FIG. 4 a recess 49b in the upper end of piston 46 extends downward from recess 49a into the piston 46 to receive the end stop 50b of spring rod 54 when the control spring 47 is in its compressed state. In operation, when brake fluid pressure is applied via hydraulic lines 28,28" from master cylinder 29, the fluid pressure acts on slide piston 49 to extend the pump piston 46 via control spring 47 until it engages the associated eccentric cam 34, and the pump piston starts to reciprocate and circulate fluid through the hydraulic loop indicated by dashed line D in FIG. 3 under control of flow control valve 39.

Figure 5:
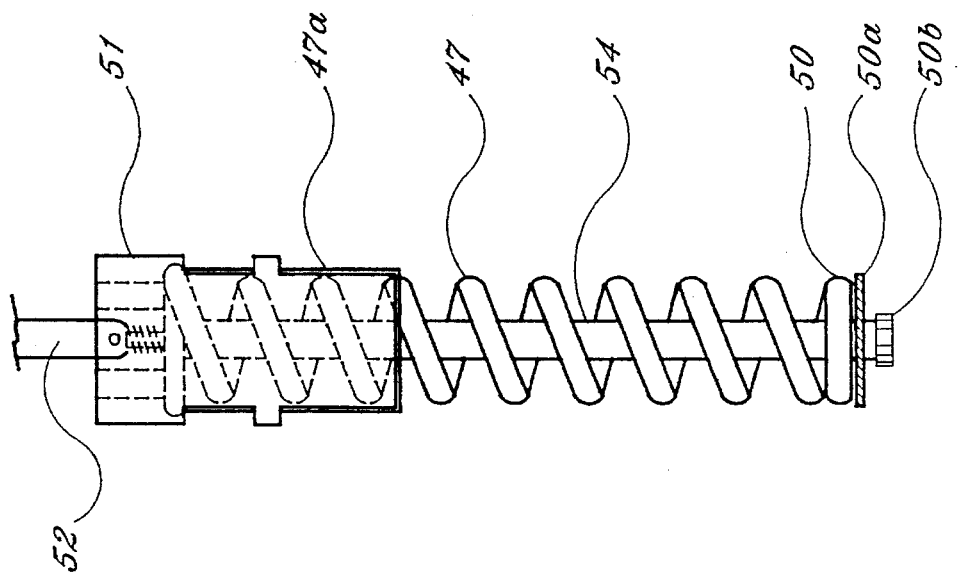
FIG. 5 is a detail elevational view of one of the piston springs of FIG. 4.

FIG. 5 shows further details of the piston control spring 47 and its connected parts including a spring retaining piston 47a, the end plate 50a, which has a center hole admitting spring rod 54, terminated in the end stop 50b. When brake pressure is applied from hydraulic line 28", slide piston 49 connected with brake control piston 51 moves downward causing control spring 47 to engage pump piston 46, which is forced downward to engage its respective eccentric cam 34 (FIG. 3).

The advantage of the slide piston arrangement shown in FIGS. 4 and 5 is that during non-braking conditions, when no hydraulic brake pressure is applied via brake lines 28,28", the pump piston 46 remains retracted inside the pump cylinder 46 without engaging the respective eccentric cam 34. As a result, minimal drag is applied to the wheels. When brake pressure is applied, the slide piston 49 is activated and drives via compression spring 47 the pump piston out of pump cylinder 46 into engagement with eccentric cam 34. As a result, pump piston 46 starts to reciprocate, pumping hydraulic fluid through the hydraulic loop shown by dotted line D in FIG. 3. The pumped fluid flow is controlled by flow control valve 39, which responds to brake fluid pressure to constrain fluid flow in proportion with the amount of brake pressure being applied.

The hydraulic lock pump units 101 depicted in FIG. 6 represent hydraulic pumps such as are depicted in FIG. 3. They are intended to be mounted on a backing plate 103 having a sealed opening for receiving vehicle axle 2',2" coupled to the vehicle wheels by gear wheels 35a, 35b. The pumps 101 are immersed in hydraulic fluid contained in enclosure 66 having a suitable cover.

FIG. 7 shows in detail a a vehicle drive shaft section 2' driving a drive wheel 82' equipped with a hydraulic brake 83' of the version shown in FIG. 2 with the eccentric cams 34 mounted on separate shaft sections 36, with one of these separate shaft sections being the vehicle axle shaft. Detail b shows a vehicle drive shaft 2", also connected with a drive wheel 82, but equipped with a hydraulic brake 83" of the version shown in FIG. 3, wherein the eccentric cams 34 are mounted on a common shaft section 36', which is also the vehicle axle shaft. A differential 81 connects the two drive shafts 2', 2", in conventional manner, with a common power source, not shown.

I claim:

1. A hydraulic brake coupled to a rotary shaft, comprising a hydraulic piston pump connected to the shaft, the pump having a pump inlet, and pump outlet, a hydraulic loop having an inlet part connected to said pump outlet and an outlet part connected to said pump inlet, flow control means disposed in said hydraulic loop between said inlet part and said outlet part for controlling flow of hydraulic fluid in said hydraulic loop, and a brake actuator connected via brake connecting means to the flow control means for controlling the flow of hydraulic fluid in response to operation of said brake actuator the hydraulic pump including at least one pump cylinder, said pump piston being in said pump cylinder, a one way inlet valve in said pump cylinder fluidly communicating with said hydraulic loop outlet part, a one way outlet valve in said pump cylinder fluidly communicating with said hydraulic loop inlet part, reciprocating means in operative engagement with said pump piston for reciprocatingly moving said pump piston in said pump cylinder, the reciprocating means being coupled to the rotary shaft, the reciprocating means including a camshaft, at least one eccentric cam on said camshaft in operative engagement with said pump piston for reciprocatingly moving said pump piston in said pump cylinder.

2. A hydraulic brake according to claim 1, wherein said flow control means include a flow control valve, a flow control cylinder in said flow control valve, a flow control piston slidably disposed in said flow control cylinder, brake linkage means for linking said brake actuator with said flow control piston, and wherein said flow control valve includes a flow control aperture, and a conical projection aligned with said flow control aperture, said conical projection extending from said flow control piston in direction to said flow control aperture.

3. A hydraulic brake according to claim 2, wherein said brake linkage means include a hydraulic brake master cylinder, a brake master piston slidably disposed in said brake master cylinder, and a hydraulic brake line fluidly connecting said brake master cylinder with said flow control cylinder for actuating said flow control piston in response to operation of said brake actuator.

4. A hydraulic brake according to claim 3, including a hydraulic fluid tank fluidly communicating with said hydraulic pump, for supplying hydraulic fluid to said hydraulic pump.

5. A hydraulic brake according to claim 3 wherein the fluid transmitted during braking from said master cylinder causes the volume of fluid contained in a displacement control cylinder (25) to be displaced as said pump piston (16) is driven into engagement with said eccentric cam such that said pump piston is in engagement with said eccentric cam only during braking.

6. A hydraulic brake according to claim 5, further including a displacement control piston (20) in said displacement control cylinder (25) for isolating fluid in said displacement control cylinder (25) and fluid in said hydraulic loop from fluid in said master cylinder and said hydraulic brake line.

7. A hydraulic brake according to claim 1, wherein said hydraulic pump includes a plurality of pump cylinders, an equal plurality of camshaft sections, said camshaft sections having respective cams, wherein said cams are angularly off-set from each other by equal angles, and gearwheel means coupled to said camshaft sections for mutually locking said camshaft sections into said equal angles.

8. A hydraulic brake according to claim 1, wherein said inlet valve is a ball valve, and said outlet valve is a poppet valve.

9. A hydraulic brake according to claim 1, wherein said hydraulic pump includes a common camshaft, a plurality of hydraulic cylinders, an equal plurality of cams, wherein said cams are disposed on said common camshaft, and wherein said cams are angularly off-set from each other by equal angles.

10. A hydraulic brake according to claim 1, including an enclosure for containing said piston pump housing, said enclosure forming an interior space for containing hydraulic fluid.

11. A hydraulic brake according to claim 10, wherein said interior space forms said hydraulic loop.

12. A hydraulic brake according to claim 1, wherein said pump cylinder includes a control spring; a tubular spring housing for containing said control spring; a slide piston in one end of said spring housing in operative engagement with one end of said control spring, the other end of said control spring in operative engagement with said pump piston; wherein said one end of said spring housing is fluidly communicating with said brake actuator for extending said pump piston into engagement with said cam via the intermediary of said control spring upon actuation of said brake actuator.

13. In combination a hydraulic brake according to claim 1, and a motor vehicle drive axle, wherein said drive axle is connected to said rotary shaft.

14. A hydraulic brake according to claim 1, including a fluid-filled brake housing disposed at an end of said rotary shaft for enclosing said piston pump, a motor vehicle drive axle and a 90 degree coupling connecting said rotary shaft with said motor vehicle drive axle.

15. A hydraulic brake according to claim 1 in which a hydraulic fluid is the medium to effect braking action.

16. A hydraulic brake according to claim 1 in which air is the medium to effect braking action.

17. A hydraulic brake system comprising a plurality of hydraulic brakes, each coupled to a respective rotary shaft, each hydraulic brake comprising a hydraulic pump connected to the respective shaft, the pump having a pump inlet, and pump outlet, a hydraulic loop having an inlet part connected to said pump outlet and an outlet part connected to said pump inlet, flow control means disposed in each hydraulic loop between said inlet part and said outlet part for controlling flow of hydraulic fluid in said hydraulic loop, and a brake actuator connected via brake connecting means to each flow control means for controlling flow of hydraulic fluid in response to operation of said brake actuator, a flow control cylinder in each flow control means, a flow control piston in each of said flow control cylinders in operative engagement with each flow control means, wherein said brake connecting means include a hydraulic brake master cylinder, a brake master piston slidably disposed in said brake master cylinder in operative engagement with each flow control piston, and a plurality of hydraulic brake lines fluidly connecting said brake master cylinder with a respective flow control cylinder for actuating a respective flow control piston in response to operation of said brake actuator, wherein said plurality of hydraulic brake lines are mutually fluidly communicating via the intermediary of said master cylinder for equalizing fluid pressure in all of said flow control cylinders each of the respective hydraulic pumps being of the type including a hydraulic pump piston, pump cylinder, eccentric cam and camshaft with the hydraulic pump piston being in operative engagement with the camshaft for reciprocatingly moving said pump piston in said pump cylinder.

18. A hydraulic brake system according to claim 17, wherein fluid pressure acting on said brake actuator via said master piston is proportional to the total fluid pressure acting on said plurality of flow control pistons.

\* \* \* \* \*